(12) United States Patent
Spriggel

(10) Patent No.: US 11,854,516 B1
(45) Date of Patent: Dec. 26, 2023

(54) SLIP NUT ASSEMBLY

(71) Applicant: Daniel John Spriggel, Henderson, NV (US)

(72) Inventor: Daniel John Spriggel, Henderson, NV (US)

( * ) Notice: Subject to any disclaimer, the term of this patent is extended or adjusted under 35 U.S.C. 154(b) by 220 days.

(21) Appl. No.: 17/300,194

(22) Filed: Apr. 12, 2021

(51) Int. Cl.
| | |
|---|---|
| *F16B 37/08* | (2006.01) |
| *F16B 21/07* | (2006.01) |
| *G10D 13/10* | (2020.01) |
| *G10D 13/063* | (2020.01) |
| *F16B 21/16* | (2006.01) |

(52) U.S. Cl.
CPC ........... *G10D 13/28* (2020.02); *F16B 21/073* (2013.01); *F16B 37/0857* (2013.01); *G10D 13/063* (2020.02); *F16B 21/16* (2013.01)

(58) Field of Classification Search
CPC .............. F16B 37/0842; F16B 37/0857; F16B 21/073; F16B 21/07; F16B 21/16; G10D 13/28; G10D 13/063
USPC .................................... 411/433, 437; 84/421
See application file for complete search history.

(56) References Cited

U.S. PATENT DOCUMENTS

| | | | | | |
|---|---|---|---|---|---|
| 531,427 | A | * | 12/1894 | Roche | B23Q 16/00 241/282 |
| 674,790 | A | * | 5/1901 | Mullaney | F16K 1/50 251/222 |
| 1,373,045 | A | * | 3/1921 | Bernhard | F16B 39/08 411/522 |
| 1,879,421 | A | * | 9/1932 | Nalle | B60B 33/0002 411/433 |
| 2,209,495 | A | * | 7/1940 | Scholfield | F16C 33/6622 411/433 |
| 2,503,135 | A | * | 4/1950 | Sikora | G10D 13/28 84/421 |
| 4,083,393 | A | * | 4/1978 | Okada | F16B 37/0857 411/935.1 |
| 4,194,847 | A | * | 3/1980 | Grey | F16B 21/16 74/342 |
| 4,768,909 | A | * | 9/1988 | Warkotsch | G01M 1/045 411/432 |
| 4,871,282 | A | * | 10/1989 | Jennings | B63B 21/502 405/203 |
| 5,139,381 | A | * | 8/1992 | Lubreski | F16B 37/0857 411/433 |
| 5,755,544 | A | * | 5/1998 | Muller | F16B 37/0864 411/433 |
| 6,004,327 | A | * | 12/1999 | Asnis | A61B 17/8869 606/104 |
| 2009/0267035 | A1 | * | 10/2009 | Wood | B66F 3/08 254/98 |
| 2012/0177463 | A1 | * | 7/2012 | Warkotsch | B62K 11/007 411/433 |

* cited by examiner

Primary Examiner — Flemming Saether
(74) Attorney, Agent, or Firm — Jack C. Munro

(57) ABSTRACT

Musical cymbals are mounted on a tripod stand using a threaded rod which is several inches in length. A conventional nut is then threaded on the rod which has to be turned a multiple number of times until the nut abuts the cymbal thereby securing the cymbal on the rod. Using the slip nut assembly of this invention eliminates this time consuming installation procedure of the nut and similarly eliminates the time consuming uninstalling of the nut when the musician is to move to a different playing location.

1 Claim, 17 Drawing Sheets

SLIP NUT ASSEMBLY

BACKGROUND OF THE INVENTION

In the playing of music it is common to utilize a human drummer. The drummer utilizes multiple tripod stands each of which include a different drum or cymbal. Each cymbal is mounted on a threaded rod which is placed on a tripod stand. The upper end of the rod is attached to a hub which is larger than the rod. Each cymbal has a center hole. The rod is located vertically and is located within the center hole. A disc shaped felt pad may be mounted on the rod. The felt pad rests against the upper surface of the cymbal.

The rod usually is several inches in length. The drummer then places a lower felt pad on the rod with the rod passing through a center hole in the lower felt pad. The lower felt pad is to abut against the bottom surface of the cymbal. The drummer then takes a conventional nut and screws such on the threaded rod. The drummer has to rotate the conventional nut several times which takes some time until the conventional nut presses the lower felt pad against the cymbal. Some drummers will have three of more tripods so the installing time for all cymbals takes several minutes which is time consuming and must be done each time the drummer installs the cymbals. Also, when disassembling the drum and cymbal stands the disengaging of each cymbal is similarly time consuming. Drummers disengage the cymbals frequently because drummers frequently move from one playing location to another.

The present invention eliminates the use of conventional nuts and a slip nut assembly is used which installs a cymbal in just seconds and uninstalls the cymbal in seconds.

SUMMARY OF THE INVENTION

A slip nut assembly that is to be used on a tripod stand that supports cymbals used in playing music. The slip nut assembly can assume any one of three different positions, an open position, a middle position or a fully locked position. In the open position the slip nut assembly can move freely on the rod. In the middle position the slip nut assembly can move ratchetly on the rod which means the user need not hold the slip nut assembly as it will remain in any established longitudinal position on the threaded rod but can be moved by the user. In the fully locked position the slip nut assembly is fixed on the threaded rod and not movable. This fully locked position is when the slip nut assembly abuts against the bottom surface of a cymbal.

DETAILED DESCRIPTION OF THE INVENTION

Figure 1:
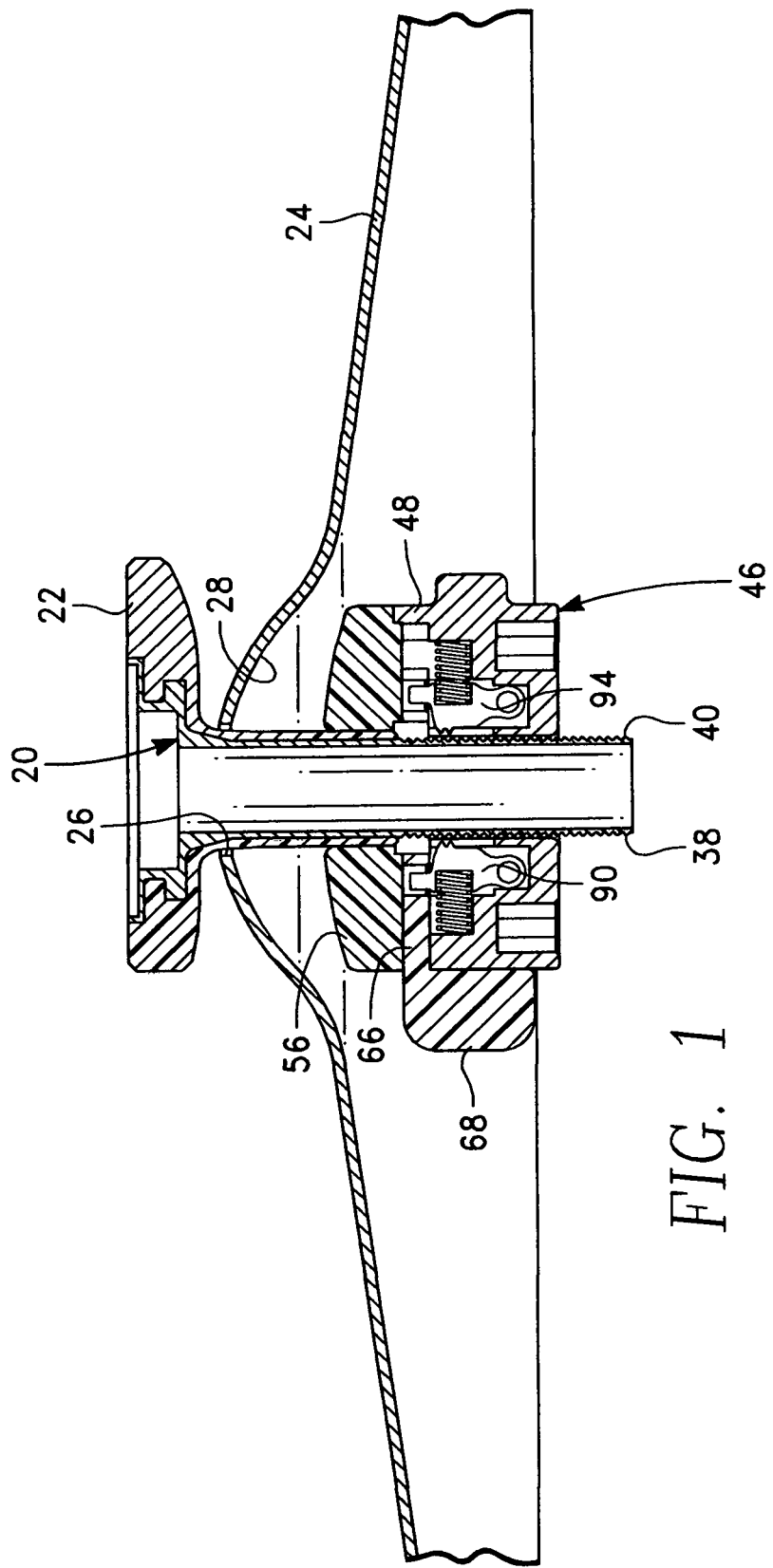
FIG. 1 is a side cross sectional view showing the slip nut assembly of this invention installed on a rod with a single cymbal installed thereon.
Figure 2:
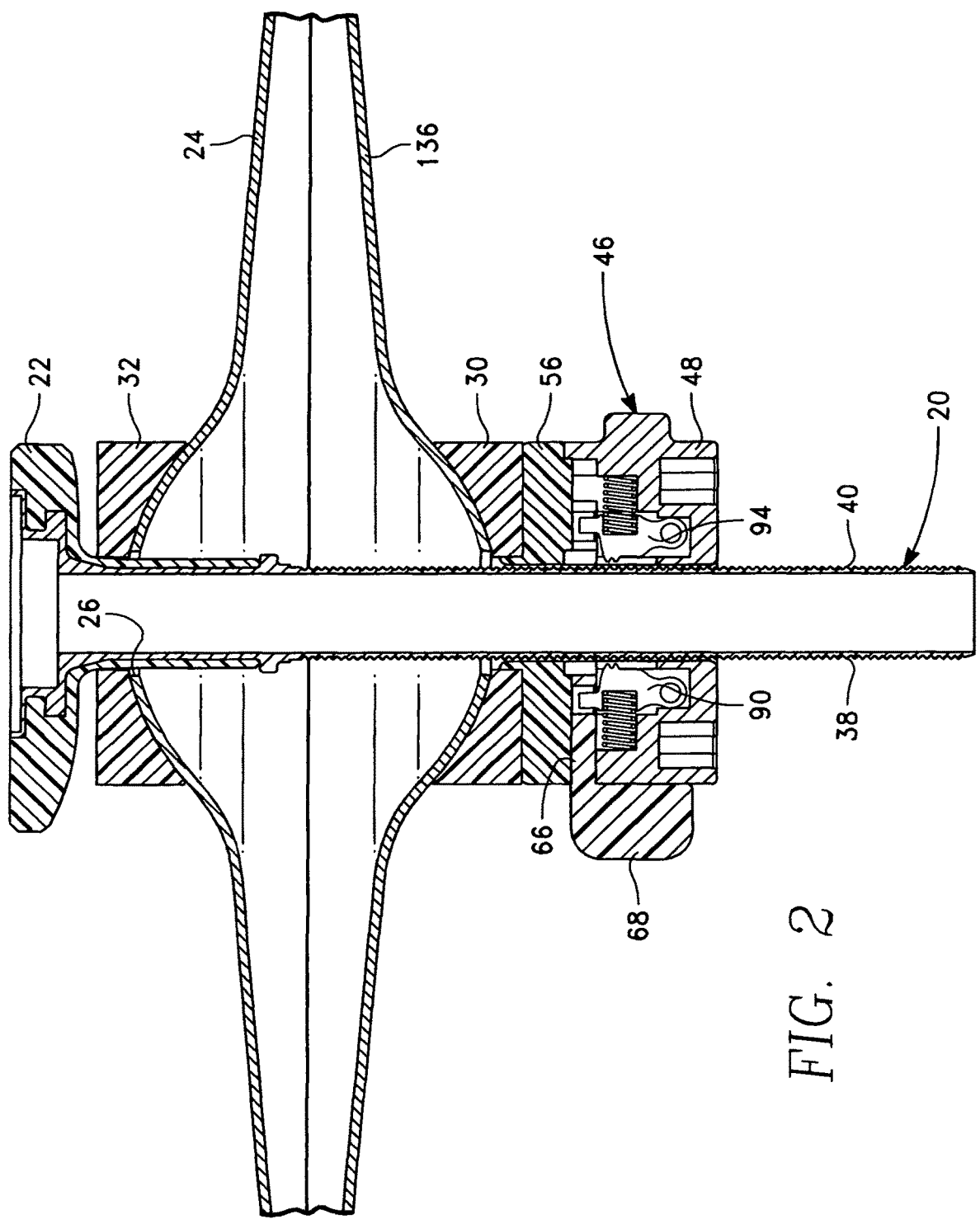
FIG. 2 is a side cross sectional view showing the slip nut assembly of this invention installed on a rod which also has a pair of cymbals installed thereon.
Figure 3:
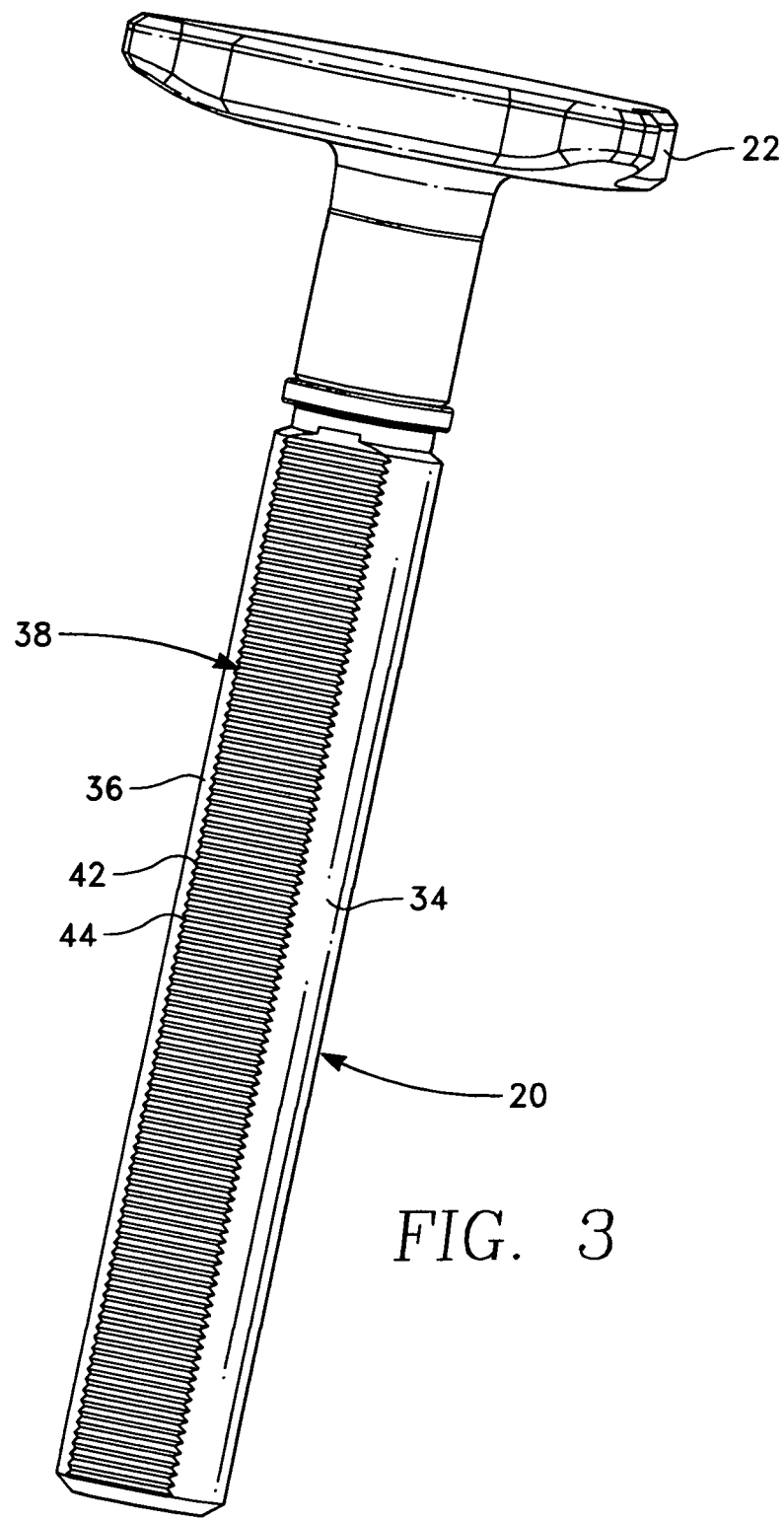
FIG. 3 is an isometric view of the rod which is used to install a single cymbal or double cymbals thereon.
Figure 4:
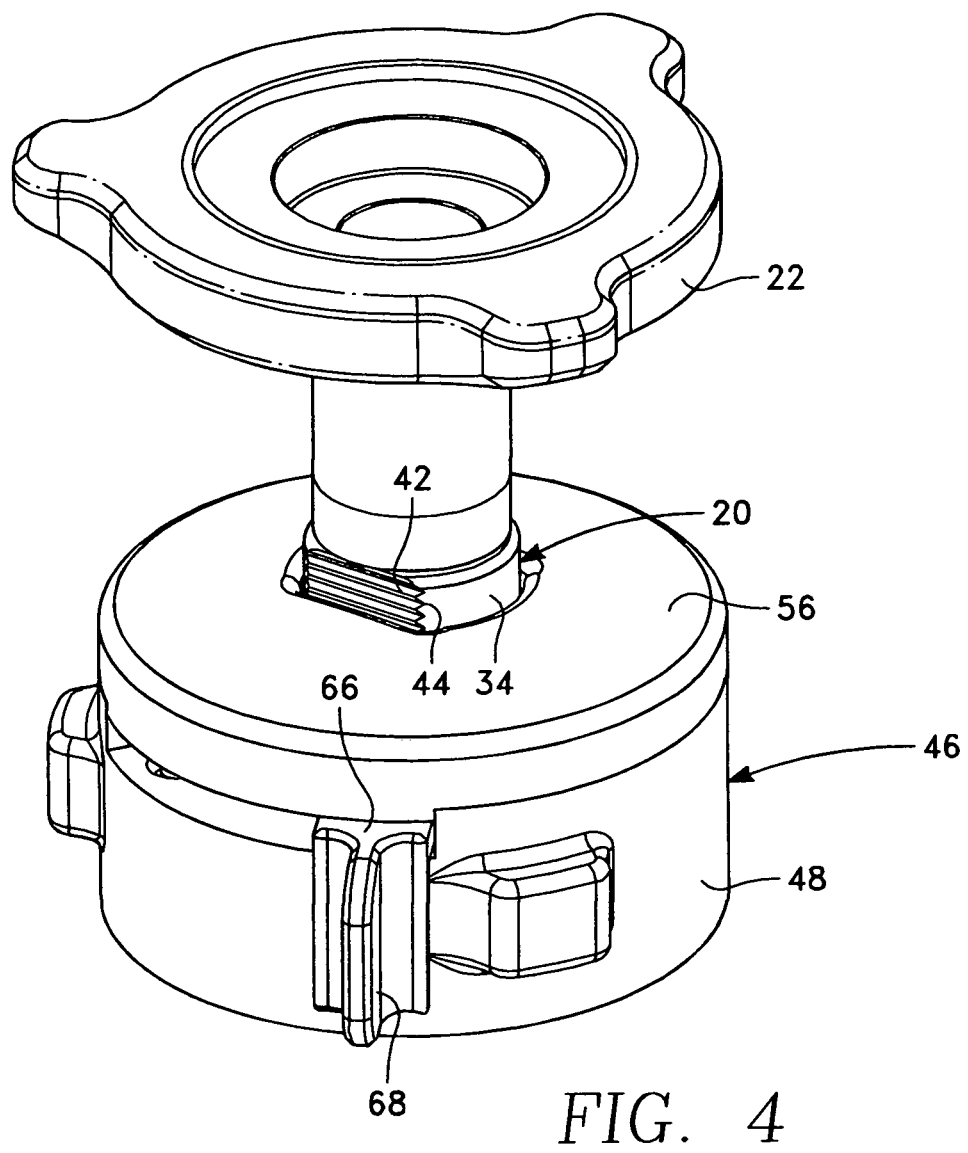
FIG. 4 is an exterior isometric view of the slip nut assembly of this invention which shows the cap that covers the body of the slip nut assembly.
Figure 5:
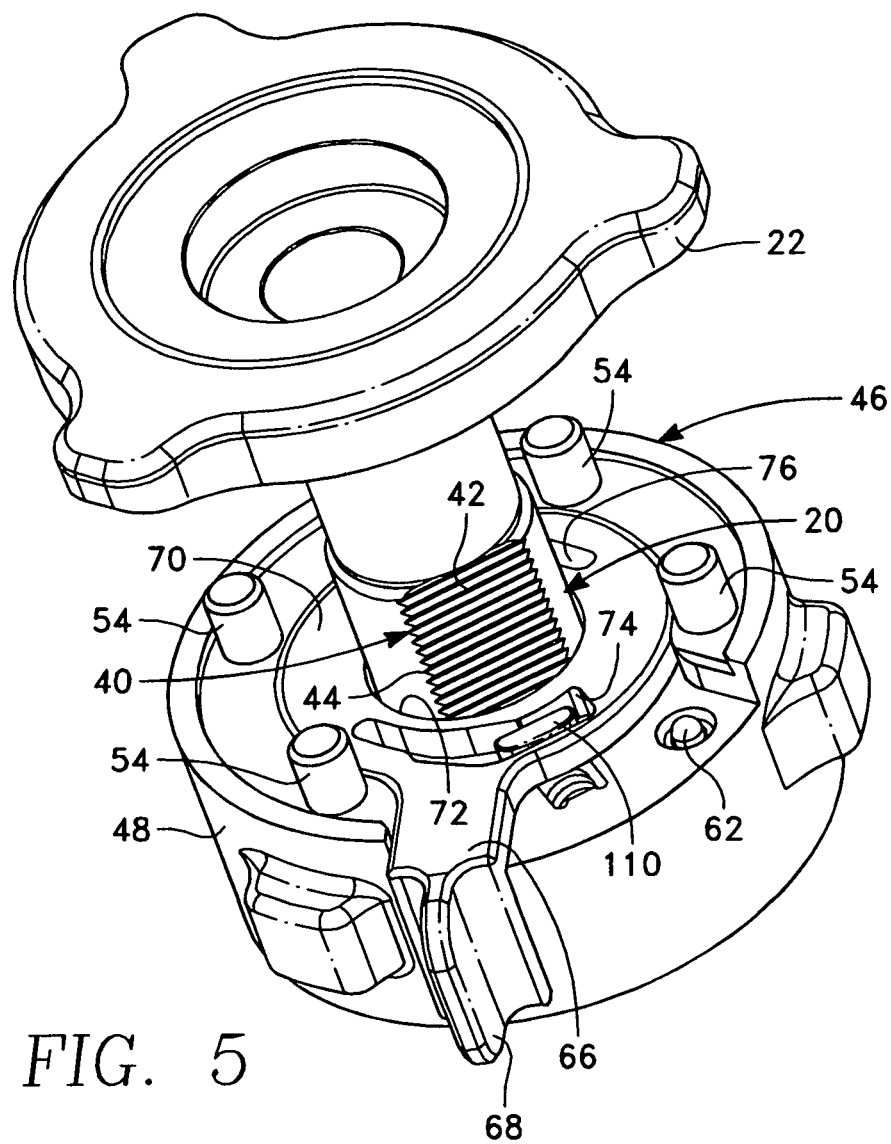
FIG. 5 is an isometric top view of the slip nut assembly of this invention with the cap removed.
Figure 6:
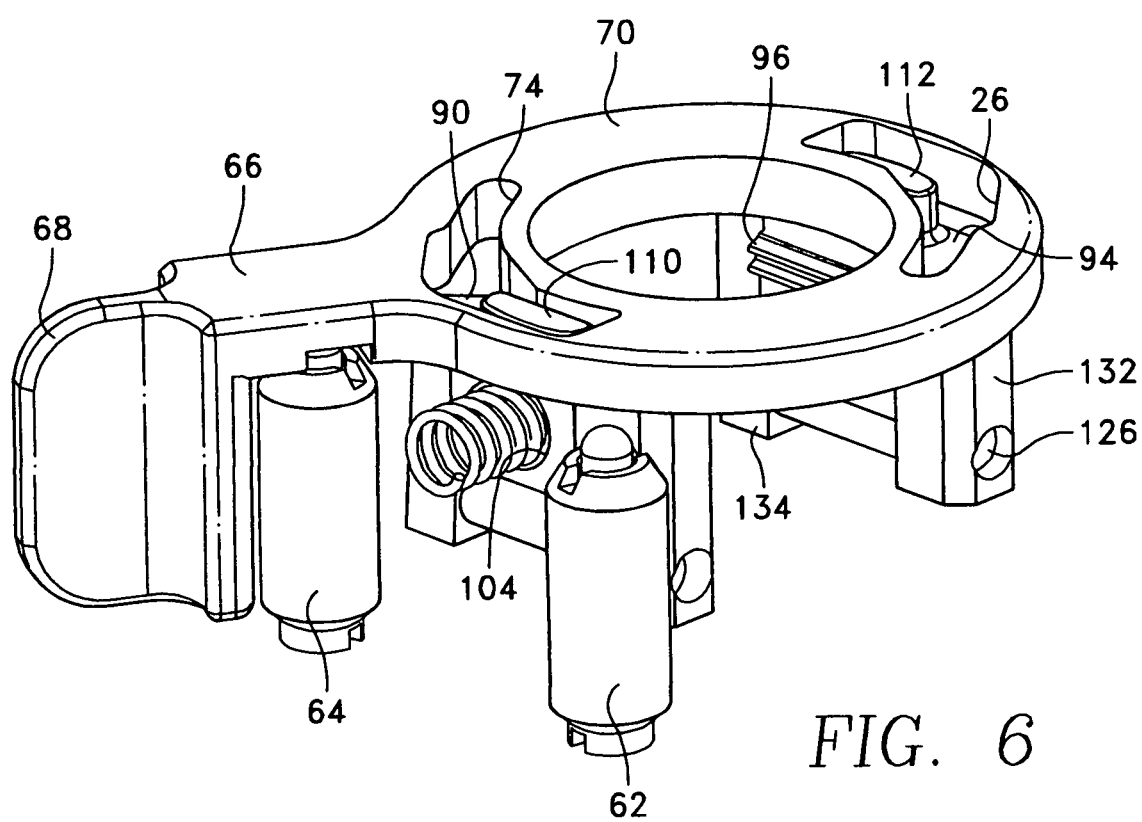
FIG. 6 is a side isometric view showing the assembled internal components contained within the body of the slip nut assembly of this invention.
Figure 7:
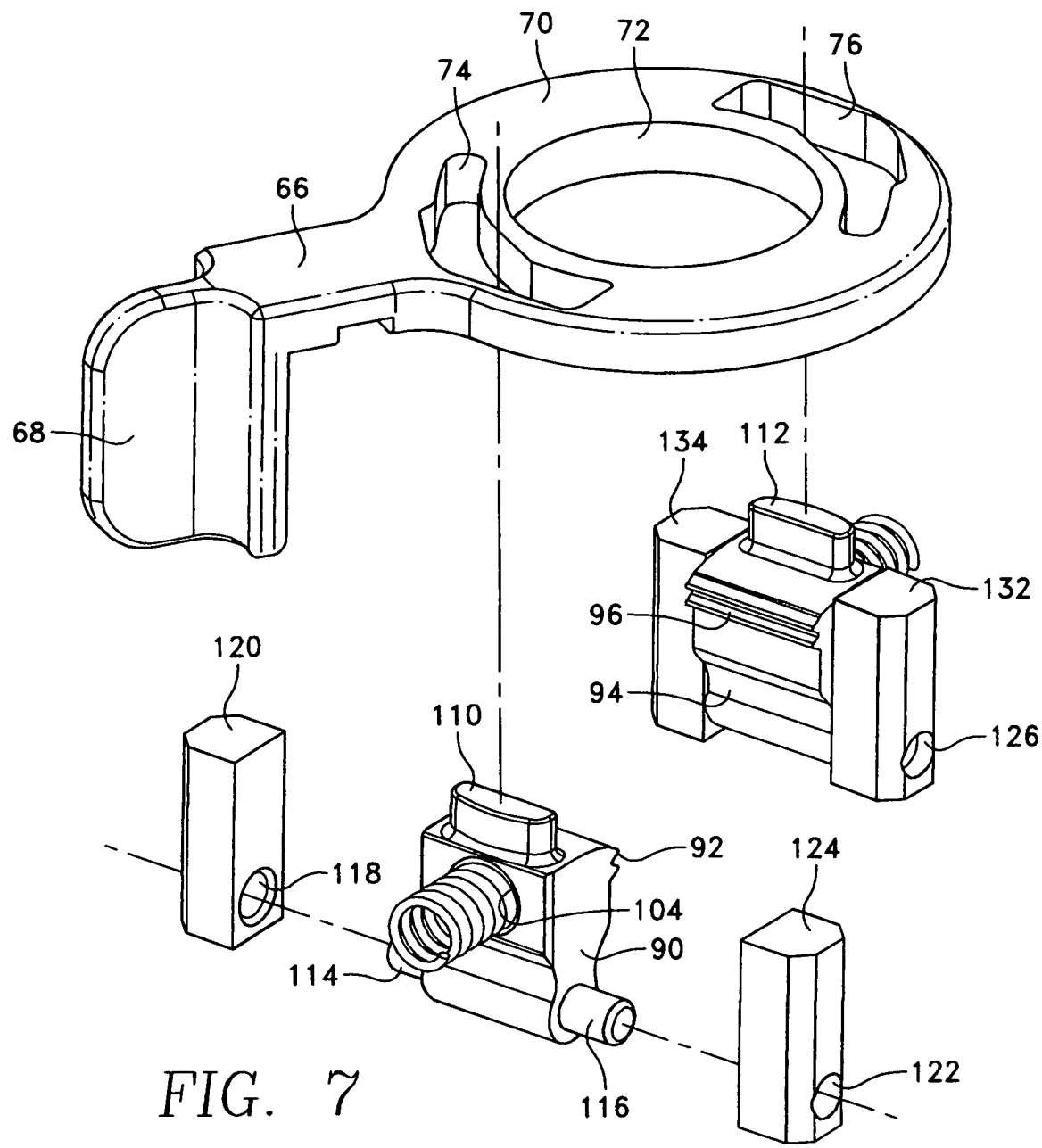
FIG. 7 is an isometric view of the internal components of the slip nut assembly showing such disassembled.

Referring to FIG. 1 there is shown a threaded rod 20 which is hollow and is securely mounted at one end to a hub 22. Hub 22 is substantially larger than threaded rod 20. The rod 20 can vary in length with the typical length being about four inches. In FIG. 2 the rod 20 is much longer than the rod 20 in FIG. 1. A cymbal 24 has a center hole 26. The cymbal 24 constitutes a musical device that is disc shaped and is supported on a tripod stand (not shown). The cymbal is intended to be struck with a stick (not shown) by a drummer. The cymbal 24 is capable of having a slight rocking movement on the rod 20. The cymbal 24 will produce a noise when struck by the stick. Although this invention has particular utility when used for mounting cymbals on a rod, it is envisioned that this invention could be used in conjunction with any article that is mounted on a rod.

The rod 20 is placed within the center hole 26. A felt pad 28 is in the shape of a washer and has a center hole. The rod 20 is located within this center hole. Pad 28 abuts against the bottom surface of cymbal 24. The drummer could use two or more felt pads 28 if desired. In FIG. 2 there is used a felt pad 32 abutting the top surface of the cymbal 24. The rod 20 is basically cylindrical in shape having a pair of smoothly contoured sections 34 and 36. The sections 34 and 36 are identical and each occupy about 90 degrees of the rod 20. The sections 34 and 36 are oppositely formed on the rod 20. Because the basic shape of the rod 20 is cylindrical the sections 34 and 36 are curved.

Located between the sections 34 and 36 are flat sections 38 and 40. Flat sections 38 and 40 are oppositely located on the rod 20. The distance between flat sections 38 and 40 is less than the distance between the sections 34 and 36. Each flat section 38 and 40 includes a series of lineal ridges 42. Each directly adjacent pair of ridges 42 are separated by a trough 44.

Figure 13:
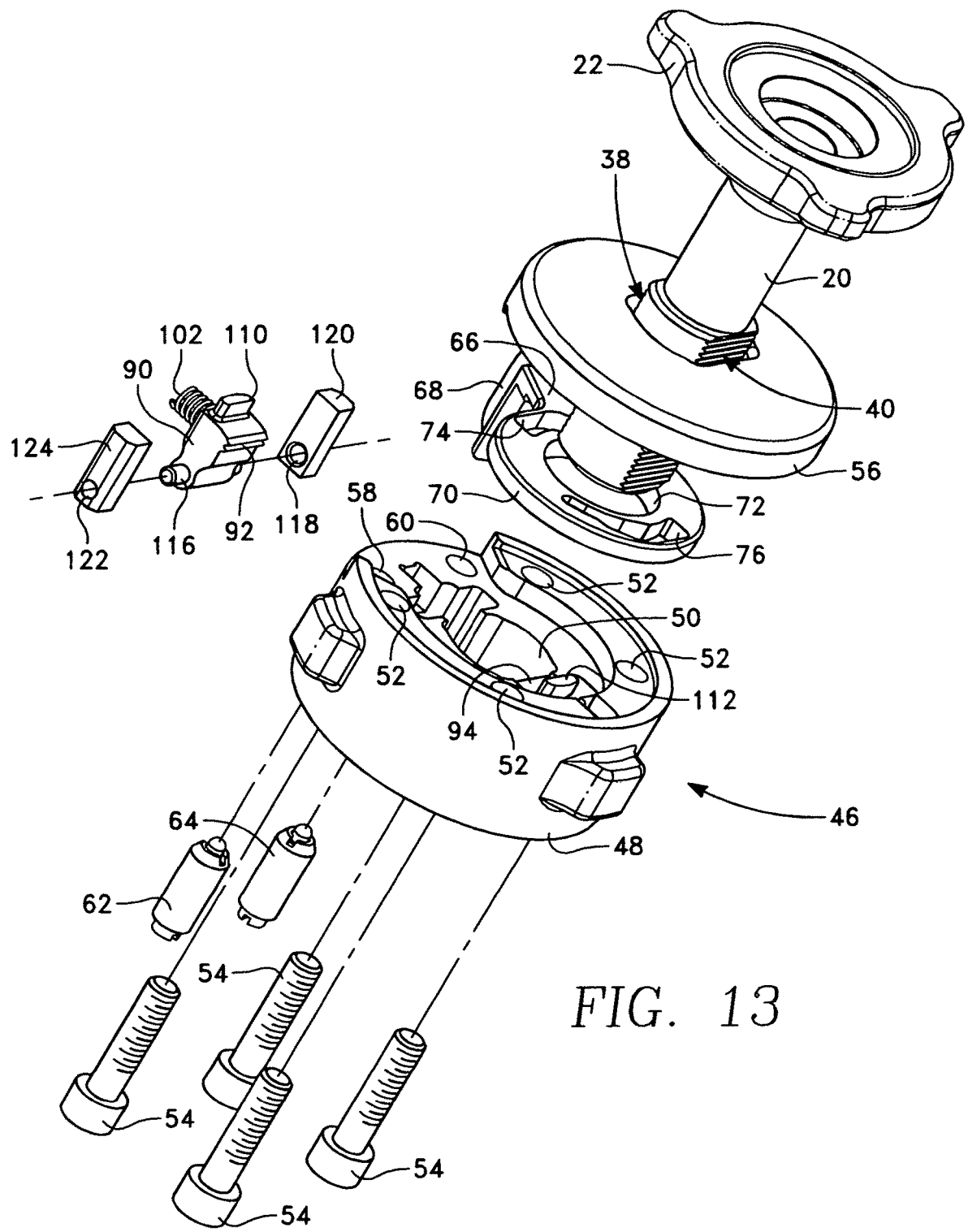
FIG. 13 is an exploded isometric view of the slip nut assembly of this invention clearly showing the internal components.

The slip nut assembly 46 will now be described. Slip nut assembly 46 has a rigid body 48 usually constructed of metal or plastic. The body 48 has a center through hole 50. The rod 20 is located within center through hole 50. Formed in body 50 are a series of through holes 52. Each through hole 52 is to connect with a bolt fastener 54. The free end of the bolt fasteners 54 is to engage with a separate recess (not shown) formed in the underside of cap 56. Cap 56 closes the body 48. Body 48 also includes a pair of closed holes 58 and 60. Hole 58 is to have a detent pin mechanism 62 mounted therein and hole 60 has an identical detent pin mechanism 64 mounted therein (FIG. 13). Each of the detent mechanisms 62 and 64 has a spring biased ball in its top surface. Each of these balls are capable of limited deflection and are to rest within a separate recess (not shown) formed in the undersurface of an actuator arm. When arm 66 engages with ball 64 the pawls 90 and 94 are not engaged with the threaded rod 20. When arm 66 engages with ball 62 the pawls 90 and 94 are in the fully locked position in tight engagement with the threaded rod 20. When arm 66 is not engaged with either ball 62 or ball 64 the pawls 90 and 94 are engaged with the threaded rod 20 but permit ratcheting movement of the slip nut assembly 46 on the threaded rod 20. The outer edge of arm 66 is integral with handle 68. Arm 66 is also integral with actuator ring 70. Ring 70 is to rest on the upper surface of body 48. Ring 70 has a center hole. Rod 20 passes through center hole 72. The drummer is to use handle 68 to manually move the actuator arm to the different positions.

Actuator ring 70 has a pair of slots 74 and 76 that are diametrically located relative to center hole 72. Slot 74 is located directly adjacent arm 66. Slots 74 and 76 are identical. Slot 74 has cam surfaces 78, 80 and 82. Slot 76 has cam surfaces 84, 86 and 88. First pawl 90 has a front surface which has a series of pawl teeth 92. Second pawl 94 has a series pawl teeth 96.

Figure 8:
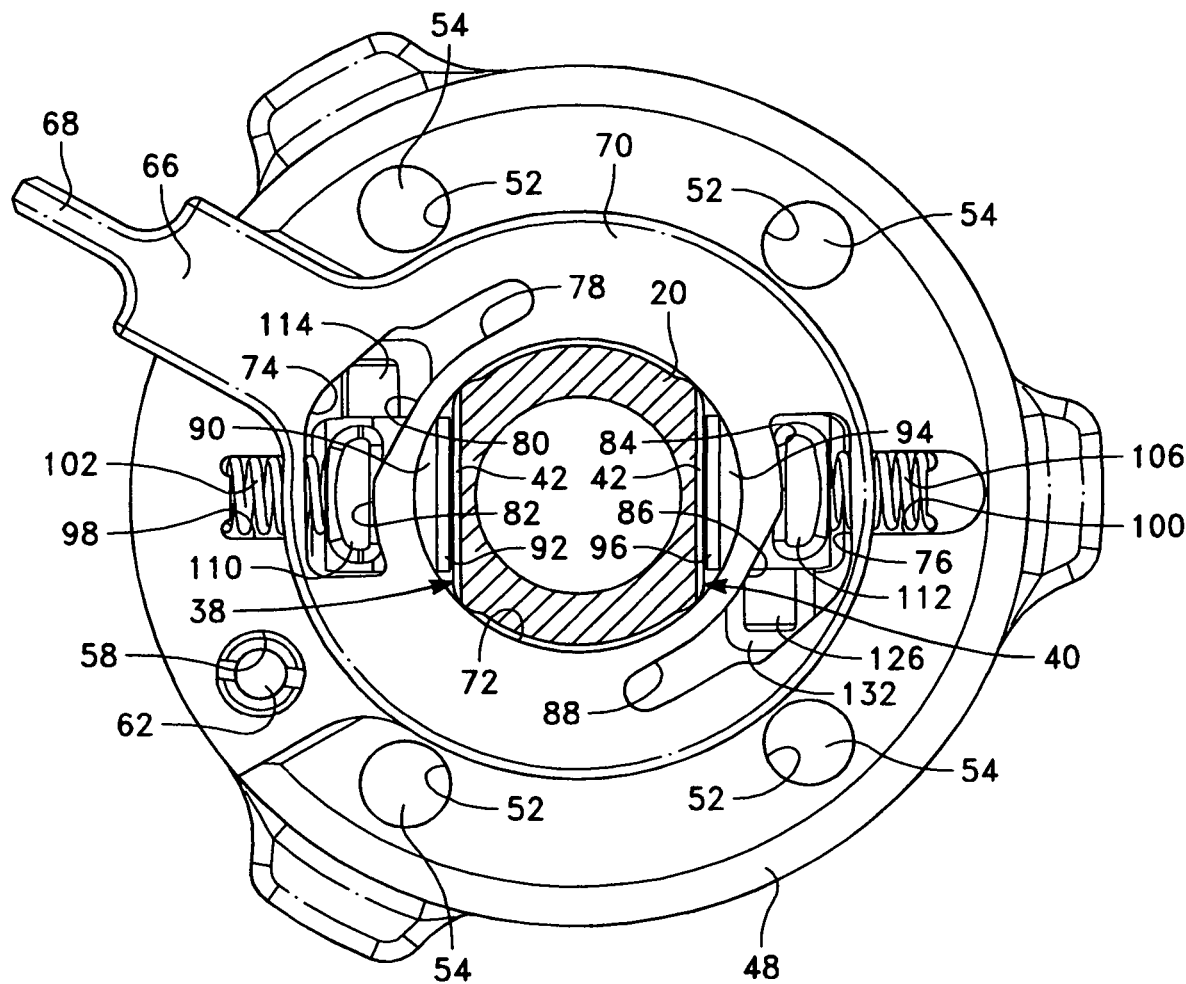
FIG. 8 is a top plan view of the slip nut assembly with the cap removed showing the slip nut assembly in the locked open position with the threaded rod.
Figure 9:
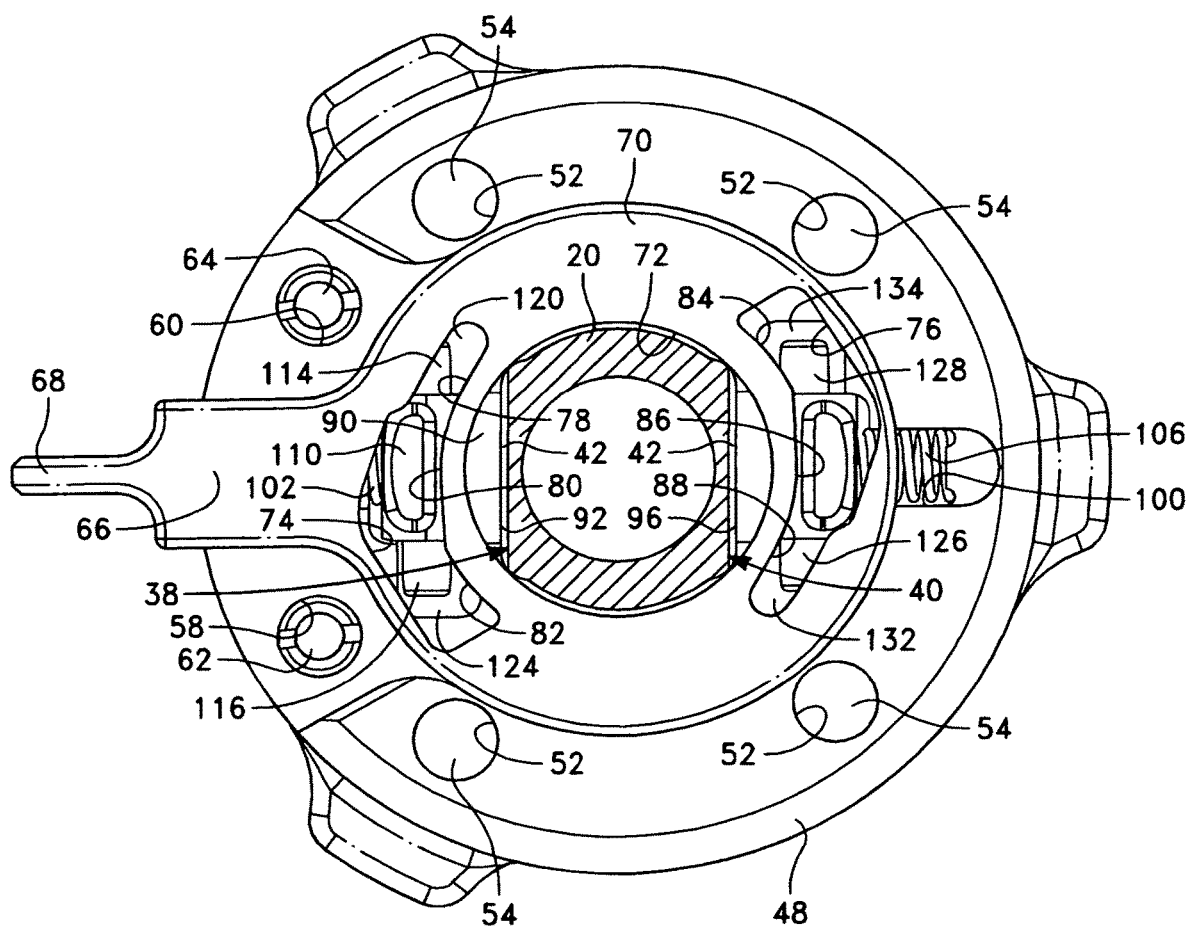
FIG. 9 is a top plan view similar to FIG. 8 showing the slip nut assembly in the middle position where the nut assembly can be moved in a ratcheting manner on the threaded rod.
Figure 14:
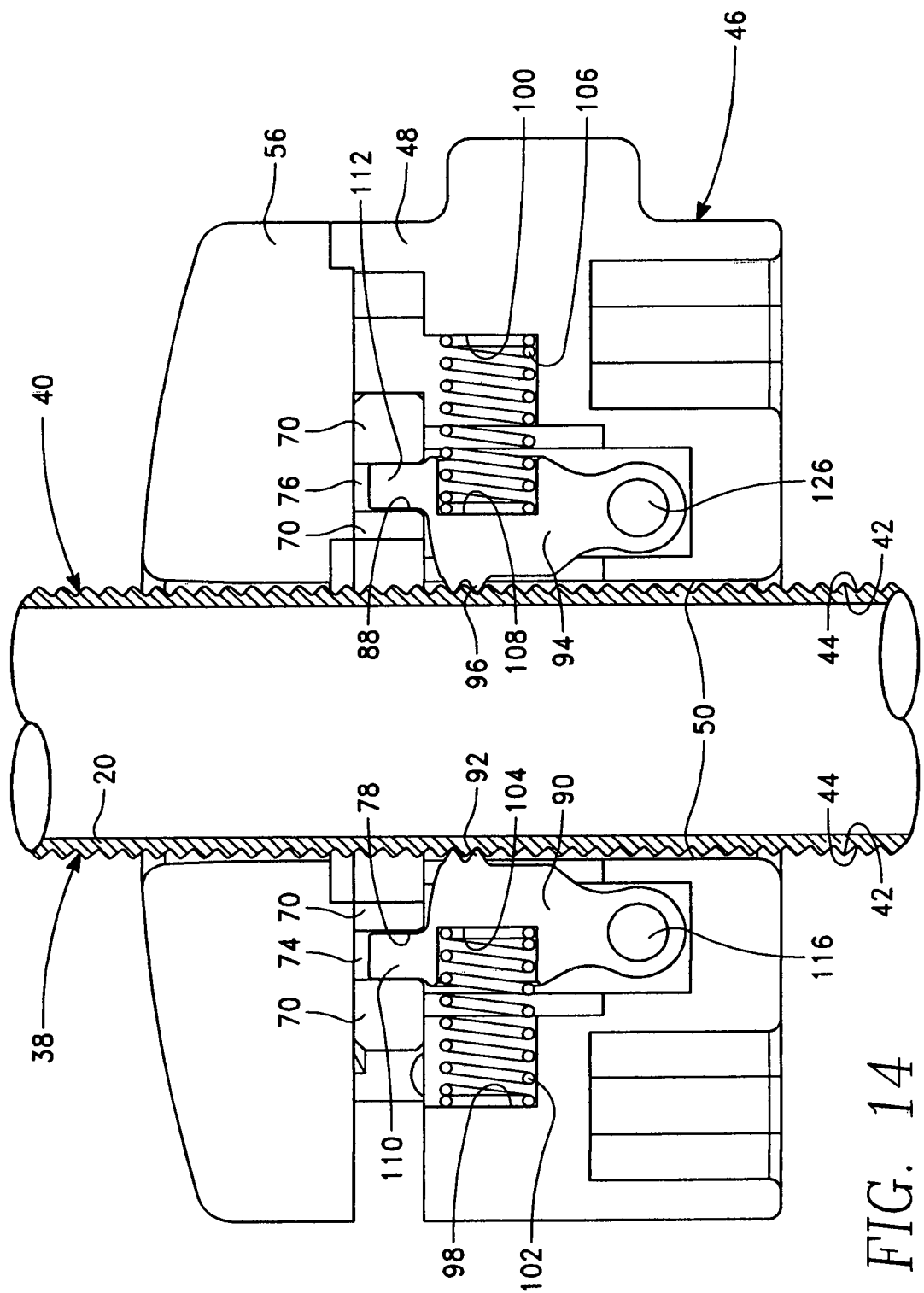
FIG. 14 is a side cross sectional view of the slip nut assembly of this invention showing the internal components in the fully locked position.
Figure 15:
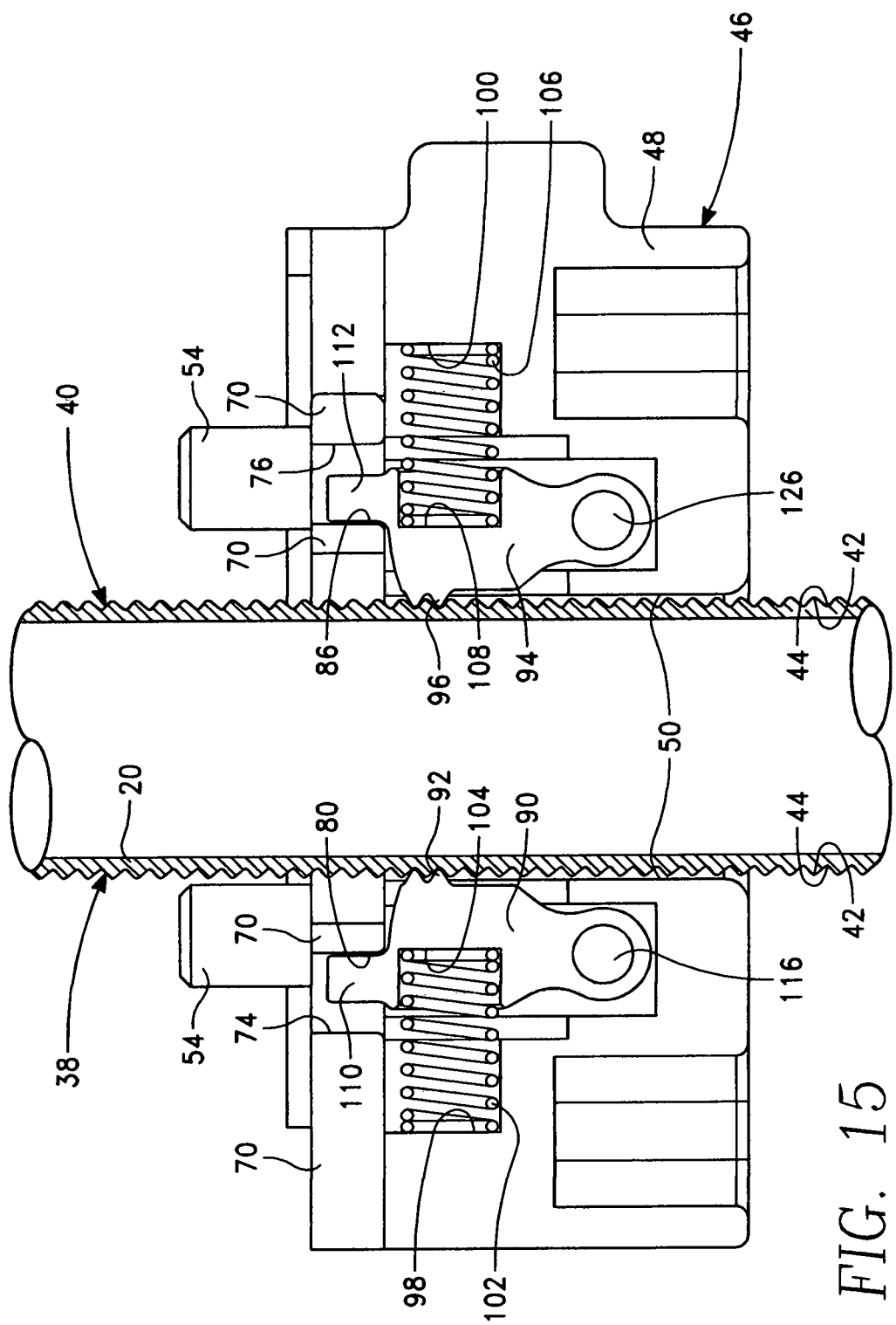
FIG. 15 is a view similar to FIG. 14 but showing the internal components in the middle position.
Figure 16:
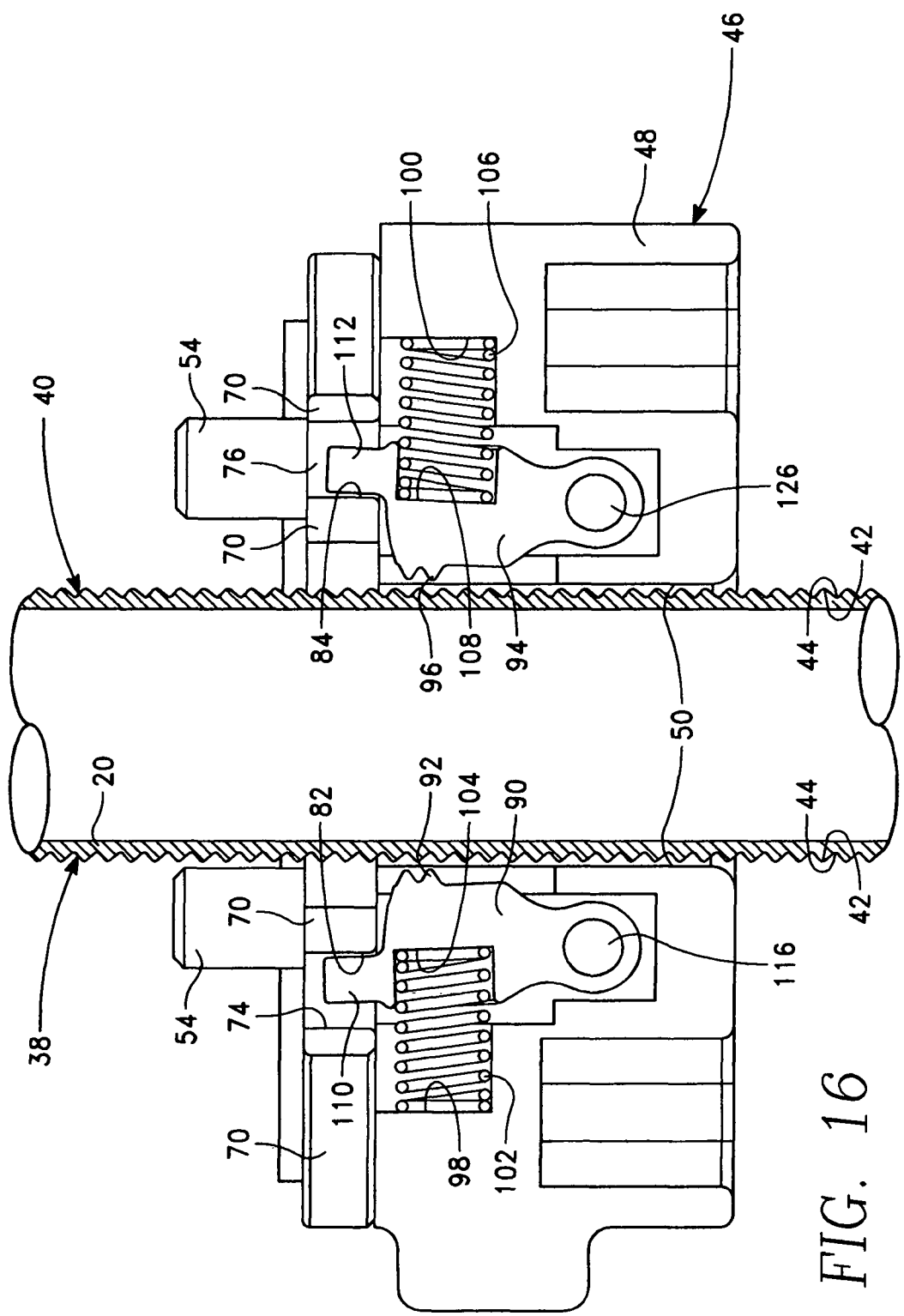
FIG. 16 is a view similar to FIG. 14 but showing the internal components in the locked open position.
Figure 17:
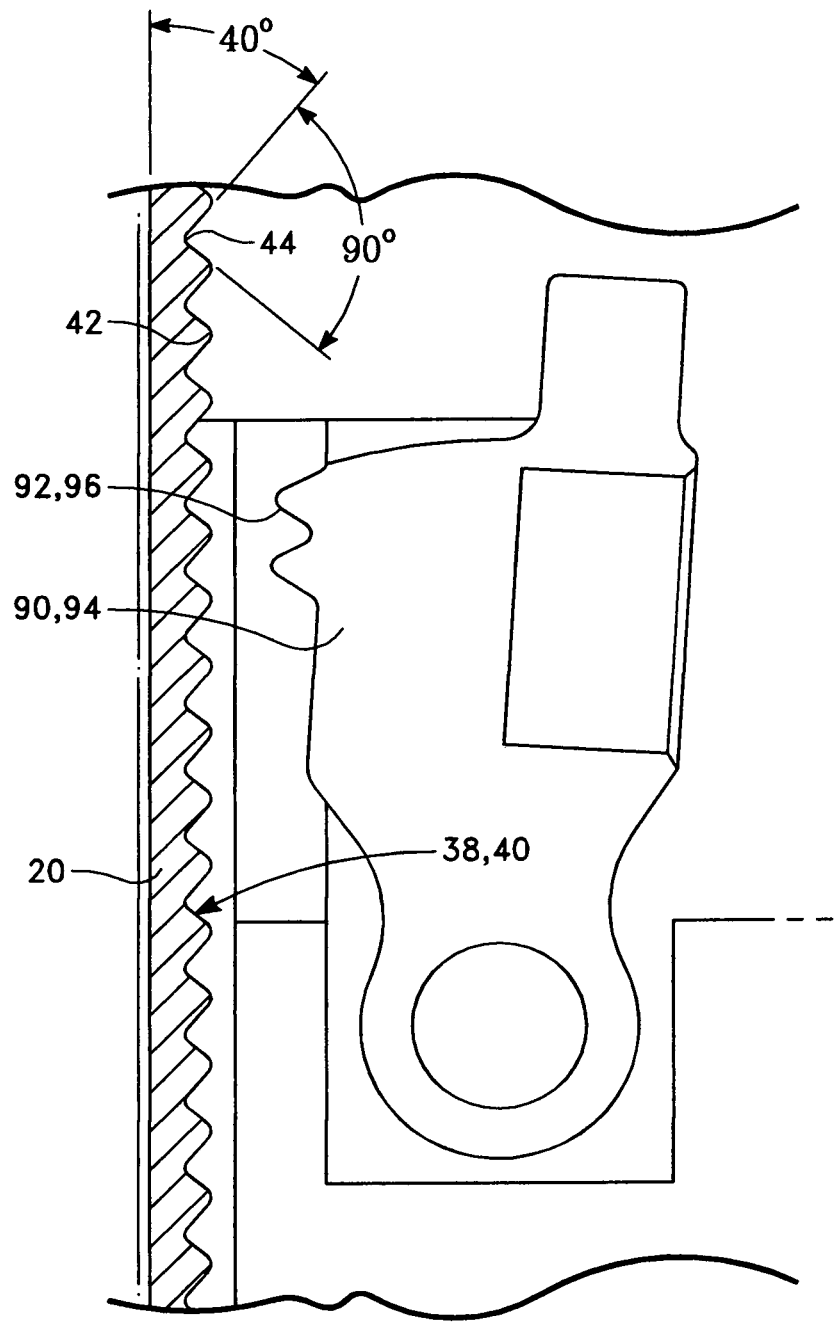
FIG. 17 is a cut away view showing the arrangement between the pawl teeth and the lineal teeth on the rod.

Body 48 has a cavity 98 located adjacent actuator arm 66. Body 48 also has a cavity 100 located diametrically opposite cavity 98. One end of coil spring 102 rests within cavity 98. The opposite end of coil spring 102 rests within cavity 104 formed in first pawl 90 (FIGS. 14-16). Coil spring 102 exerts a constant force on first pawl 90 pushing first pawl 90 toward flat section 38. One end of coil spring 106 rests within cavity 100. The opposite end of coil spring 106 rests within cavity 108 formed in second pawl 94. Coil spring 106 pushes against second pawl 94 toward flat section 38. First pawl 90 has a cam 110 mounted on its upper surface. Cam 110 rides within slot 74. Second pawl 94 has a cam 112 mounted on its upper surface. Cam 112 rides within slot 76. When cam 110 connects with cam surface 82 and cam 112 connects with cam surface 84 pawl teeth 92 and 96 are not engaged so the slip nut assembly 46 can freely move on rod 20 (FIG. 8). When cam 110 connects with cam surface 80 and cam 112 connects with cam surface 86 (FIG. 9) pawl teeth 92 and 96 are engaged with lineal ridges 42 but the slip nut assembly 46 can ratchetly move on rod 20. When cam 110 tightly connects with cam surface 78 and cam 112 tightly connects with cam surface 88 the pawl teeth 92 and 96 are securely engaged with threaded sections 34 and and 36 which locks the slip nut assembly 46 onto the rod 20 preventing its movement. The pawls 90 and 94 move in unison but in opposite directions. Pawls 90 and 94 both move toward threaded rod 20 when occupying an engaged position. Pawls 90 and 94 both move away from threaded rod 20 when moving to the disengaged position.

First pawl 90 has pins 114 and 116 mounted on opposing sides. Pin 114 is located within hole 118 formed in block 120. Pin 116 is located within hole 122 formed in block 124. First pawl 90 is pivotable by pins 114 and 116 turning relative to blocks 120 and 124.

Second pawl 94 has pins 126 and 128 mounted on opposing sides. Pin 126 is located within hole 130 formed in block 132. Pin 128 is located within a hole (not shown) formed in block 134. Second pawl 94 is pivotable by pins 126 and 128 turning relative to blocks 120 and 124. The amount of pivoting movement of both pawls 90 and 94 is only a few degrees.

Figure 10:
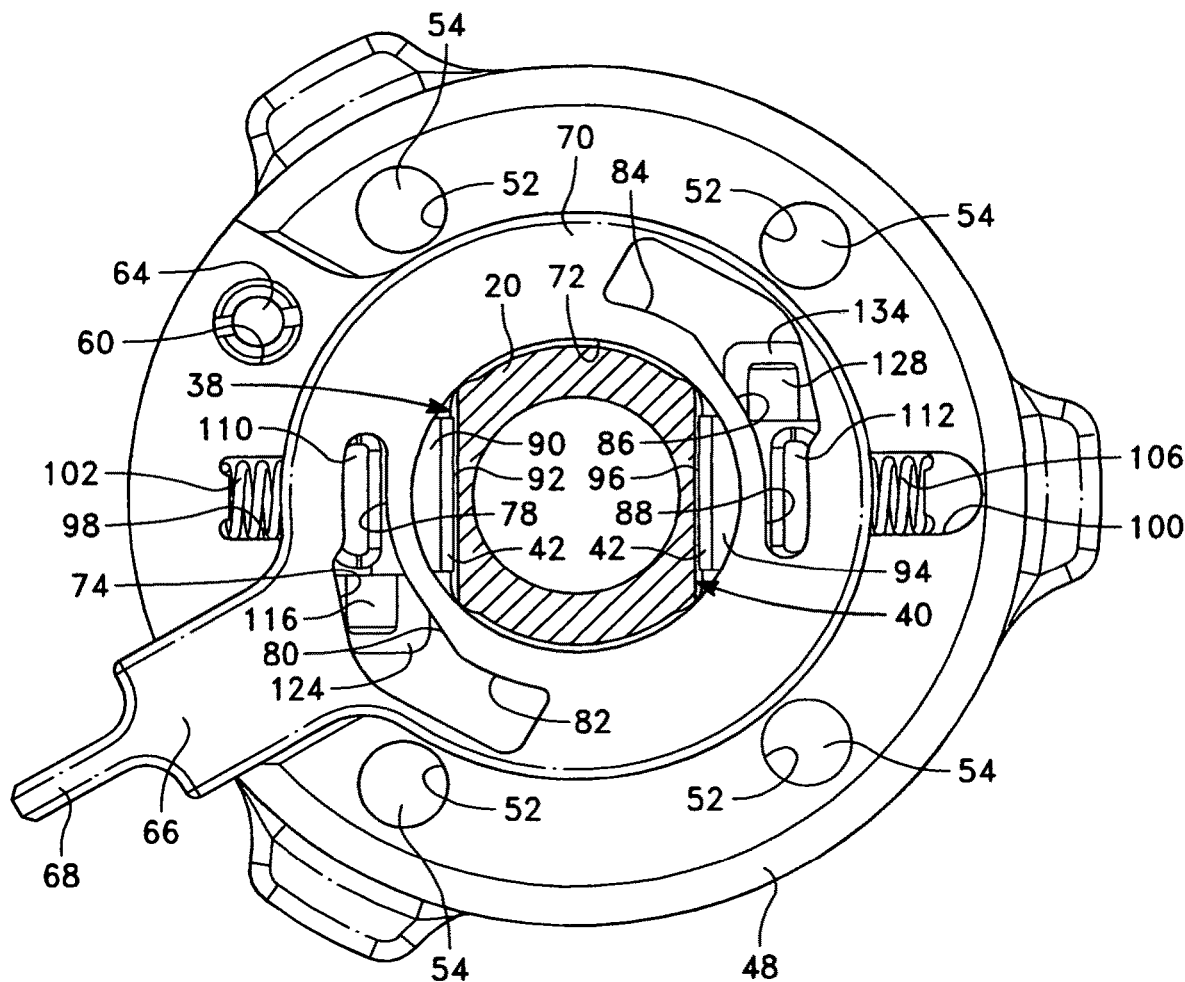
FIG. 10 is a top plan view similar to FIG. 8 showing the slip nut assembly in the fully locked position on the threaded rod.
Figure 11:
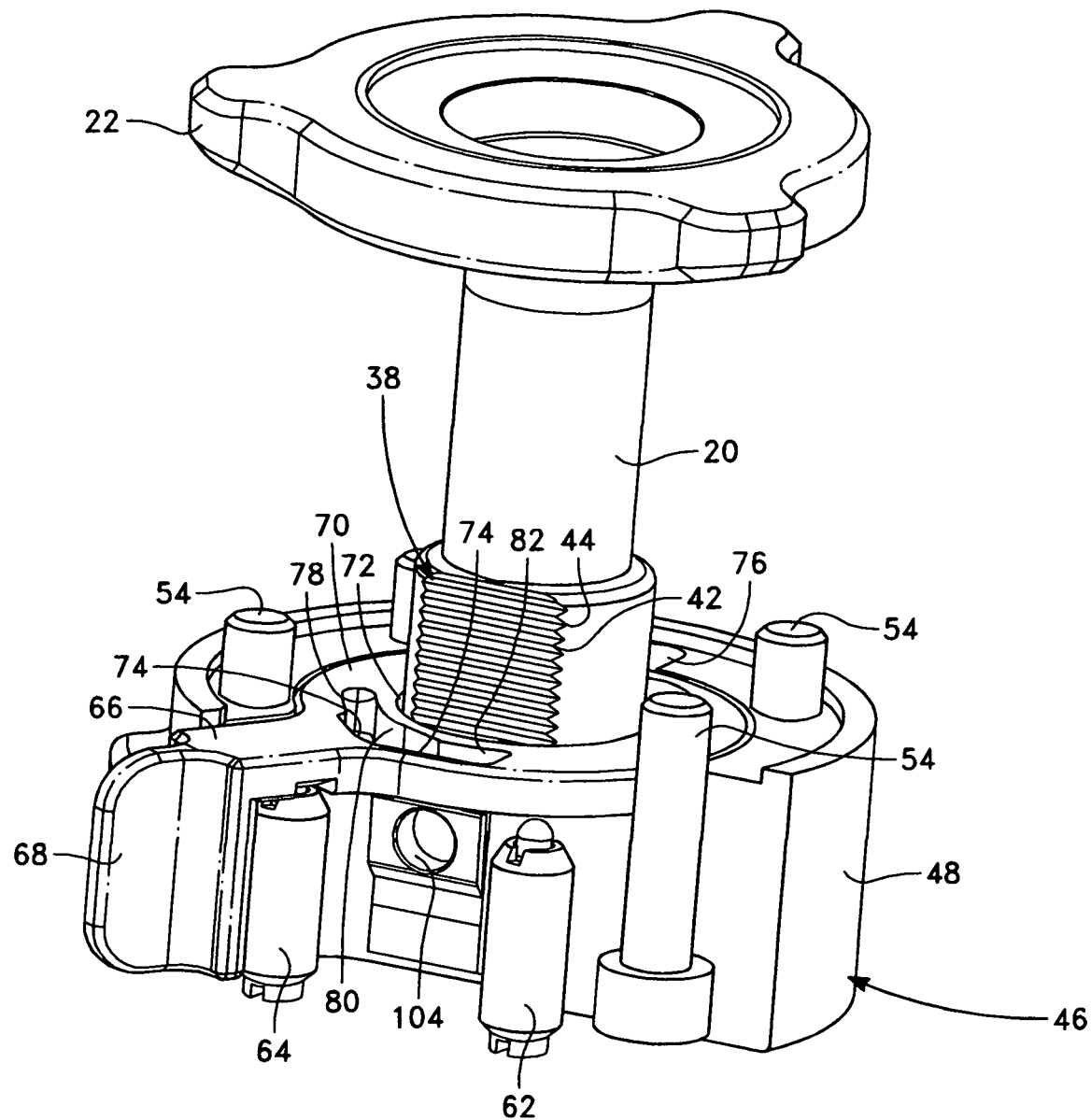
FIG. 11 is a view similar to FIG. 4 but with the body of the slip nut assembly cut away showing the internal components.

The drummer places the slip nut body 48 on the rod 20 when the handle 68 is in the position shown in FIG. 8. The cam surfaces 82 and 84 cause their respective pawls 90 and 94 to be located so their respective pawl teeth 92 and 96 are spaced from the lineal ridges 42. The slip nut assembly 46 can then freely move on the rod 20 and the drummer can then move the slip nut assembly 46 to contact the felt pad 28 in FIG. 1 or the felt pad 30 in FIG. 2. Once the drummer establishes the desired amount of pressure onto the cymbal 24 or cymbal 136 the drummer moves handle 68 from the locked open position of FIG. 8 counter clockwise to the locked closed position shown in FIG. 10. At this time the slip nut assembly 46 is fixed in position on the rod 20 by pawl teeth 92 and 96 tightly engaging the lineal ridges 42 and located within the troughs 44. When the slip nut assembly is in the open position the slip nut assembly can just slide off the rod 20 if the drummer is not holding the slip nut assembly. To avoid this the drummer could place the handle in the middle position shown in FIG. 9. In this middle position the pawl teeth 92 and 96 are engaged with the lineal ridges 42 but the drummer can move (ratchet) the slip nut assembly 46. The bias of the coil springs 102 and 106 force the pawls 90 and 94 in the teeth engaging position with the lineal ridges 42. If the drummer takes his or her hand off the slip nut assembly 46 it will remain in its established position. However if the drummer wishes to move the slip nut assembly 46 the drummer can do so and the pawl teeth 92 and 96 will ratchet on the lineal ridges 42. The drummer can use this middle position to establish a certain force pressing on the cymbal 24 or 136 through the felt pad 28 or 30 and then strike the cymbal to see if the desired tone is achieved. If so, the drummer then moves the handle 68 to the fully locked position of FIGS. 10 and 14 which tightly engages pawl teeth 92 and 96 with the lineal ridges 42. The drummer then plays the cymbal(s). It is to be noted that the pawl teeth 92 and 96 always move in unison but in opposite directions. In other words when teeth 92 are spaced from the shaft 20 so also are teeth 96 similarly spaced. When teeth 92 are in the middle position, so also are teeth 96. When teeth 92 are in the fully locked position so also are teeth 96.

Figure 12:
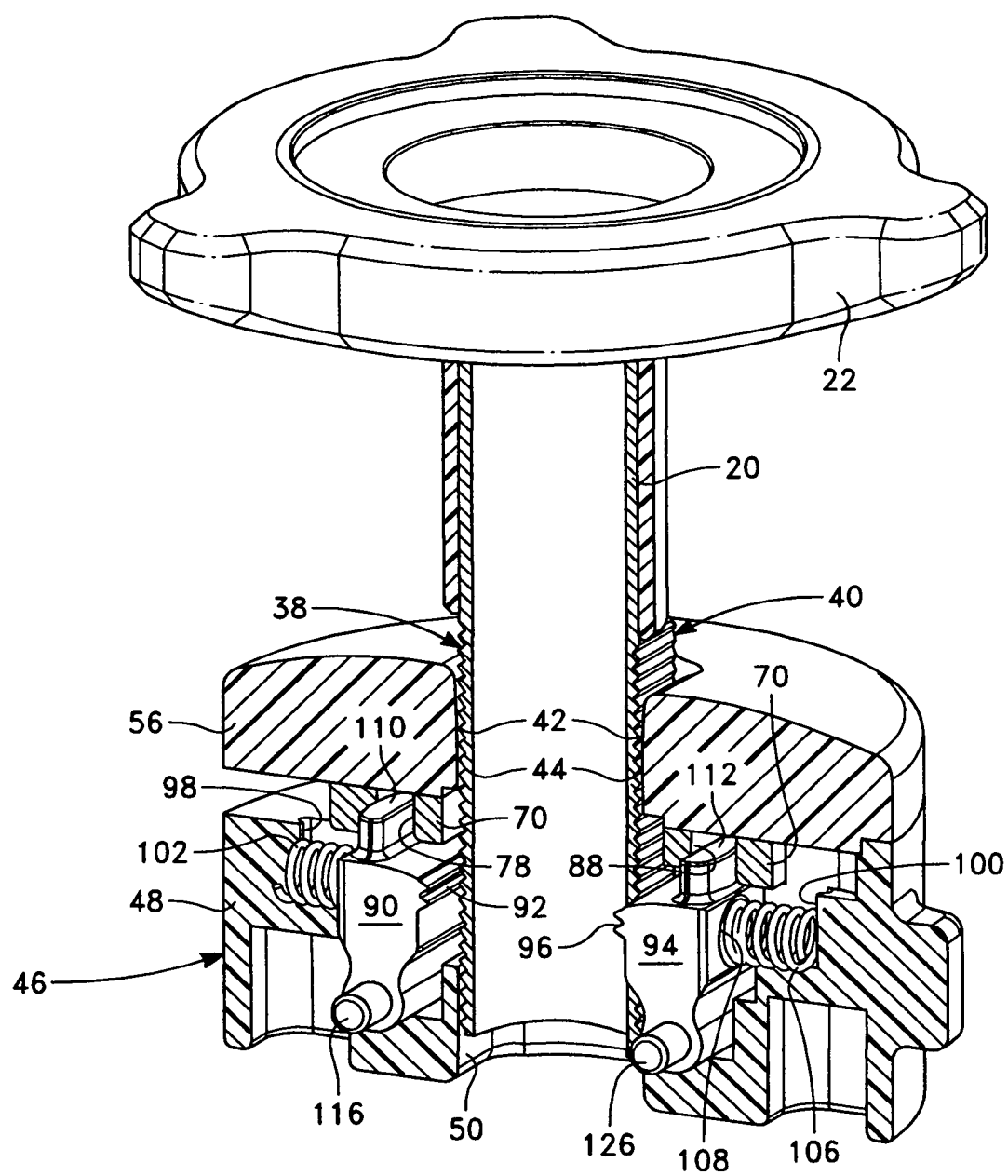
FIG. 12 is a cross sectional view showing the internal components with the slip nut assembly in the closed locked position.

To insure that there will be no accidental disengagement of the pawl teeth 92 and 96, the lineal ridges 42 are cut at a forty degree angle relative to vertical. The trough 44 is cut at a ninety degree angle. As a result the pawl teeth tightly engage the lineal ridges 42 when the slip nut assembly 46 is in the fully locked position shown in FIGS. 10, 12 and 14.

The invention claimed is:

1. A slip nut assembly to be used on a cylindrical rod to fix in position an article mounted on said cylindrical rod comprising:

said cylindrical rod having a pair of curved sections which are separated by a pair of spaced apart flat sections, each said flat section includes a series of lineal ridges, each directly adjacent pair of said ridges are separated by a trough;

a first pawl mounted in a first slot located in an actuator arm, said first pawl located directly adjacent one of said pair of said lineal ridges, said cylindrical rod being mounted within a through hole formed in said actuator arm;

a second pawl mounted in a second slot also located in said actuator arm, said second pawl located directly adjacent the other of said pair of lineal ridges;

both said first pawl and said second pawl are capable of being located in a disengaged position not connecting with their respective said lineal ridges permitting free lineal movement relative to said actuator arm or in a ratcheting position permitting movement of said cylindrical rod relative to said actuator arm or in a fully locked position fixing said cylindrical rod to said actuator arm, said first pawl to move in unison with said second pawl but in an opposite direction; and both said first pawl and said second pawl being spring biased toward said cylindrical rod.

* * * * *